United States Patent
Cockburn et al.

(12)

(10) Patent No.: US 11,572,978 B2
(45) Date of Patent: Feb. 7, 2023

(54) ELASTOMERIC HOLDER

(71) Applicant: TOOLETRIES PTY LTD, Newstead (AU)

(72) Inventors: Saul Cockburn, Newstead (AU); Joshua Cockburn, Newstead (AU); Angus Chapman, Brisbane (AU)

(73) Assignee: SJC IP HOLDINGS PTY LTD, Virginia (AU)

( * ) Notice: Subject to any disclaimer, the term of this patent is extended or adjusted under 35 U.S.C. 154(b) by 0 days.

(21) Appl. No.: 16/751,370

(22) Filed: Jan. 24, 2020

(65) Prior Publication Data

US 2021/0247022 A1   Aug. 12, 2021

Related U.S. Application Data

(63) Continuation-in-part of application No. 15/761,935, filed as application No. PCT/AU2016/050606 on Jul. 12, 2016, now Pat. No. 10,542,849.

(30) Foreign Application Priority Data

| Sep. 23, 2015 | (AU) | 2015903874 |
| Sep. 23, 2015 | (AU) | 2015903875 |
| Oct. 16, 2015 | (AU) | 2015904236 |

(51) Int. Cl.
*F16M 13/02* (2006.01)
*A47K 5/04* (2006.01)
*A47B 97/00* (2006.01)
*A47G 1/16* (2006.01)
*A47K 5/18* (2006.01)

(52) U.S. Cl.
CPC ........ *F16M 13/022* (2013.01); *A47B 97/001* (2013.01); *A47G 1/1606* (2013.01); *A47K 5/04* (2013.01); *A47K 5/18* (2013.01); *A47K 2201/02* (2013.01)

(58) Field of Classification Search
CPC .................................................. F16M 13/022
USPC .................................... 4/596, 605, 581, 903
See application file for complete search history.

(56) References Cited

U.S. PATENT DOCUMENTS 10,542,849 B2 * 1/2020 Cockburn .............. A47K 3/281

* cited by examiner

*Primary Examiner* — Lori L Baker
(74) *Attorney, Agent, or Firm* — Moore & Van Allen PLLC

(57) ABSTRACT

Elastomeric holders in the form of toiletry holders, mirrors holders, shower caddies and make-up holders. The holders comprise a body, having a substantially planar rear surface, configured to releasably adhere to a vertical surface without the use of adhesives, and a retainer, for retaining an item and formed at least in part by the body, such that a front surface of the body forms a peripheral edge around the retainer.

20 Claims, 16 Drawing Sheets

ELASTOMERIC HOLDER

TECHNICAL FIELD

The present invention relates to elastomeric holders. In particular, although not exclusively, the present invention relates to toiletry holders, holders including mirrors, make-up holders, and the like, that can be releasably adhered to vertical surfaces.

BACKGROUND ART

Toiletry holders are well known in the art and can be used to store razors, toothbrushes and shampoo bottles, for example, and ensure that they dry properly after use. These holders vary in shape and design, but are often cup-like holders that either sit on a basin or ledge, or attach to a wall, e.g. in a shower area.

Toiletry holders that attach to a wall are generally more desirable, as they can be conveniently located, for example in a shower or on a mirror, and do not clutter ledges or other flat surfaces. Such holders are generally either permanently installed, e.g. with fixtures or adhesive, or temporarily installed with one or more suction cups that attach to a glossy surface, such as a mirror or a tile.

A problem with such toiletry holders of the prior art is that they are not particularly suitable for repeated installation and removal, as permanently installed holders generally damage the surface in which they are installed, and suction cups are prone to breakage. In particular, the suction cup is generally behind the holder, and is removed by pulling on the holder itself. This applies significant stress on the suction cup, and in particular where the suction cup attaches to the holder.

A further problem with toiletry holders of the prior art is that they are complicated to manufacture. In particular, a holder portion is generally manufactured separately from the suction cup portion, and subsequently assembled.

A further problem with toiletry holders of the prior art is that they may not be suitable for installation in a shower, or other area where they are exposed to streams of water.

Yet another problem with toiletry holders of the prior art is that they are generally not easy to clean. For example, dirt and grime generally accumulate at joins between the holder portion and the suction cups, and between the holder portion and the mirror or tile against which the holder is attached.

Furthermore, in bathroom environments, it is very desirable to have mirrors at convenient locations, as they enable a person to accurately apply make up, shave, or adjust their hair, for example.

However, such mirrors face similar problems to the toiletry holders discussed above. For example, mirrors that attach to a wall are generally more desirable, but such mirrors of the prior art is that they are not particularly suitable for repeated installation and removal. Furthermore, these mirrors are generally complicated to manufacture and are generally not easy to clean.

Finally, make-up holders, shower caddies and the like also face similar problems to toiletry holders, in that wall-based holders are more desirable, as they can be conveniently located, but are generally not particularly suitable for repeated installation and removal, are generally complicated to manufacture and are generally not easy to clean.

As a result, there is clearly a need for improved holders.

It will be clearly understood that, if a prior art publication is referred to herein, this reference does not constitute an admission that the publication forms part of the common general knowledge in the art in Australia or in any other country.

SUMMARY OF INVENTION

The present invention is directed to elastomeric holders, which may at least partially overcome at least one of the abovementioned disadvantages or provide the consumer with a useful or commercial choice.

With the foregoing in view, the present invention in one form, resides broadly in an elastomeric holder comprising:

a body, having a substantially planar rear surface, configured to releasably adhere to a vertical surface without the use of adhesives; and a retainer, for retaining an item and formed at least in part by the body, such that a front surface of the body forms a peripheral edge around the retainer.

Advantageously, the holder can be used to grip to shiny surfaces like glass, mirror, tiles and metal (e.g. lockers or filing cabinets), without requiring adhesives, suction caps or permanent mounts. The peripheral edge around the retainer assists in enabling the body to adhere to the vertical surface.

Furthermore, the holders are generally easy to clean and hygienic. For example, as the holders sit flush against the vertical surface on which they are attached, dirt and grime cannot build up behind the holders. Furthermore, the holders may be cleaned by rinsing it under warm or hot water, or by placing them in a dishwasher, without removing any adhesive properties of the holder.

Preferably, the peripheral edge is at least about 5 mm wide. Suitably, the peripheral edge is at least about 10 mm wide.

Preferably, the retainer comprises at least one pocket, extending outwardly from a central portion of the front surface.

Preferably, the pocket is for receiving a toiletry. The toiletry may be a toothbrush. Suitably, the pocket is configured to receive a toothbrush and toothpaste.

Preferably, the holder further includes a razor holder, for receiving a razor, the razor holder extending outwardly from a front surface of the body.

Suitably, the razor holder is adjacent to the pocket.

Preferably, the razor holder is configured to receive a head of a razor.

Preferably, the razor holder comprises parallel arms that extend outwardly from the body. Preferably, the arms extend perpendicularly from the front surface of the body. Preferably, the razor holder is configured such that a handle of the razor extends between the arms.

Preferably, the parallel arms each define an upper support surface. Preferably, the upper support surfaces are in a common plane.

Preferably, the upper support surfaces include a plurality of protuberances. Suitably, the protuberances are elongate.

Preferably, the razor holder includes vertical flanges, which support the arms. Preferably, the vertical flanges extend outwardly from the front surface and along each of the arms.

Preferably, the holder includes a ring holder, for receiving a ring, the ring holder extending outwardly from a front surface of the body. Suitably, the ring holder is adjacent to the pocket.

Preferably, the holder comprises parallel arms that extend outwardly from the body. Preferably, the arms extend perpendicularly from the front surface of the body.

Preferably, the ring holder comprises a base, wherein the arms extend upwardly from respective edges of the base. Preferably, the ring holder comprises a front, which extends upwardly from a front portion of the base and between end portions of the arms. Preferably, the base comprises a substantially planar support surface, and is surrounded by substantially vertical walls.

Preferably, the retainer includes a drainage aperture.

Preferably, the ring holder includes a drainage aperture. Suitably, the ring holder includes a plurality of drainage apertures, to prevent water from being contained in the ring holder.

Preferably, the pocket includes a drainage aperture. Suitably, the pocket includes a plurality of drainage apertures, to prevent water from being contained in the pocket.

The ring holder may be above the razor holder. The ring holder may be beside the pocket. The razor holder may be beside the pocket.

Preferably, the body is substantially rectangular. Preferably, the body is substantially planar. The body may be primarily of uniform thickness. Suitably, the body is primarily about 1 mm thick. Suitably, the body is about 145 mm wide and about 215 mm long.

Preferably, the pocket is elongate. Preferably, the pocket is about 90 mm long, 65 mm wide, and 35 mm deep.

Preferably, the retainer comprises a razor holder, for receiving a razor. The razor holder may extend outwardly from a front surface of the body.

Preferably, the body is substantially rectangular. Preferably, the body is substantially planar. Suitably, the body is primarily about 1 mm thick. Suitably, the body is about 60 mm wide and about 145 mm long.

Preferably, the razor holder is configured to receive a head of a razor.

Preferably, the razor holder comprises parallel arms that extend outwardly from the body. Preferably, the arms extend perpendicularly from the front surface of the body. Preferably, the razor holder is configured such that a handle of the razor extends between the arms.

Preferably, the parallel arms each define an upper support surface. Preferably, the upper support surfaces are in a common plane.

Preferably, the upper support surfaces include a plurality of protuberances. Suitably, the protuberances are elongate.

Preferably, the razor holder includes vertical flanges, which support the arms. Preferably, the vertical flanges extend outwardly from the front surface and along each of the arms.

Preferably, the retainer is for retaining a planar mirror, wherein edges of the mirror are encased in the body.

Preferably, the body is substantially rectangular. Preferably, the body is substantially planar. Suitably, the body is primarily about 1 mm thick. Suitably, the body is about 80 mm wide and about 145 mm long.

Preferably, the body comprises a lip that extends over an edge of the mirror. Suitably, the lip extends approximately 1 mm over a reflective surface of the mirror.

Preferably, the planar mirror is polycarbonate. Alternatively, the planar mirror is acrylic or any other suitable rigid, non-metallic, non-glass material.

Preferably, the holder is a make-up holder.

Preferably, the holder comprises a plurality of pockets.

Preferably, the holder comprises adjacent pockets configured to form an intermediate retainer between the pockets. The intermediate retainer may be configured to wedge objects therein. The intermediate retainer may be tapered such that objects (e.g. brushes) of various thicknesses can be held therein, e.g. upside down.

Preferably, the holder is integrally formed.

Preferably, the holder is formed of silicone rubber. However, any other elastomeric material may be used.

Preferably, the rear surface comprises a glossy surface. Suitably, a front surface of the body comprises a non-glossy surface. Preferably, the rear surface is smoother than a front surface of the body.

Preferably, the holder is formed by moulding liquid silicone rubber. Suitably, the silicone rubber may be treated using antibacterial or antifungal chemicals.

Preferably, the retainer(s) forms at least 50% of a front surface of the body.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
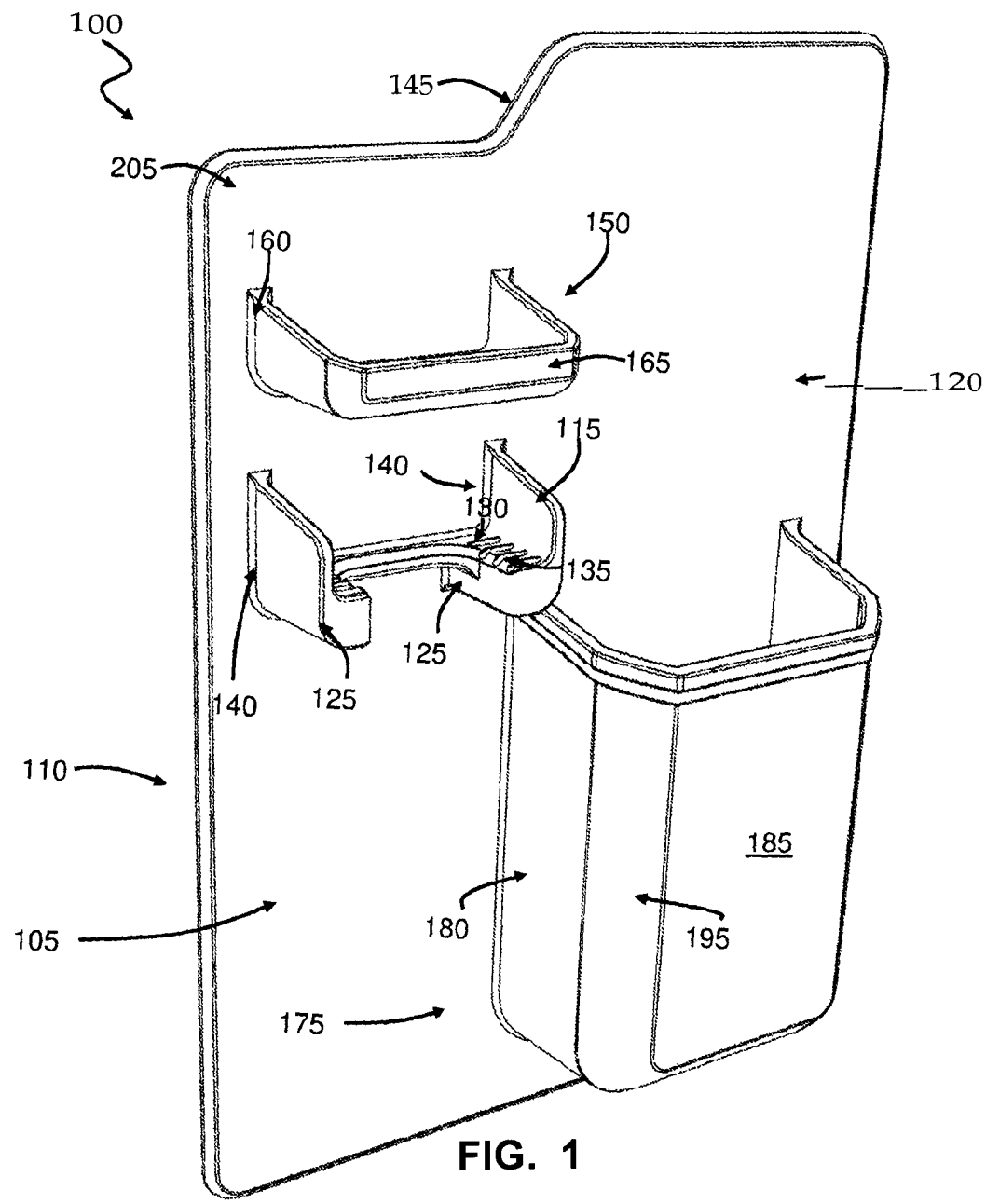
FIG. 1 illustrates an upper front perspective view of a toiletry holder, according to an embodiment of the present invention.

FIG. 1 illustrates an upper perspective view of a toiletry holder 100, according to an embodiment of the present invention. The toiletry holder 100 provides a non-permanent, handy and hygienic place to store a toothbrush, toothpaste, ring and razor in the shower (e.g. on a tile, glass or other flat surface) or above the sink (e.g. on a tile or mirror).

Figure 3:
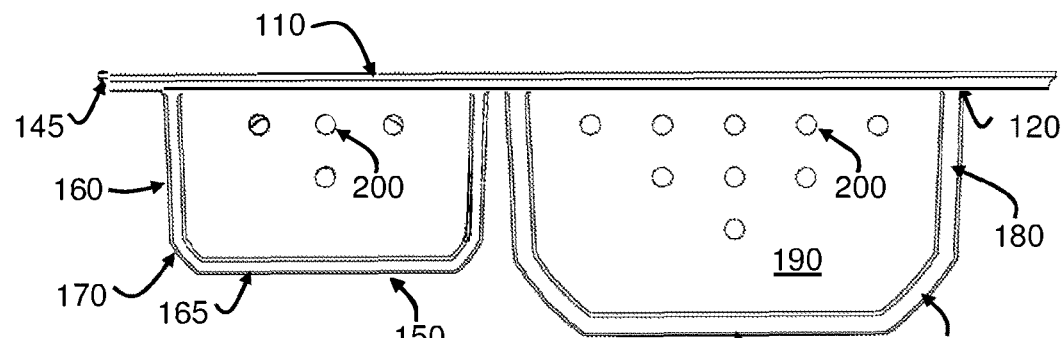
FIG. 3 illustrates a top view of the toiletry holder of FIG. 1.
Figure 4:
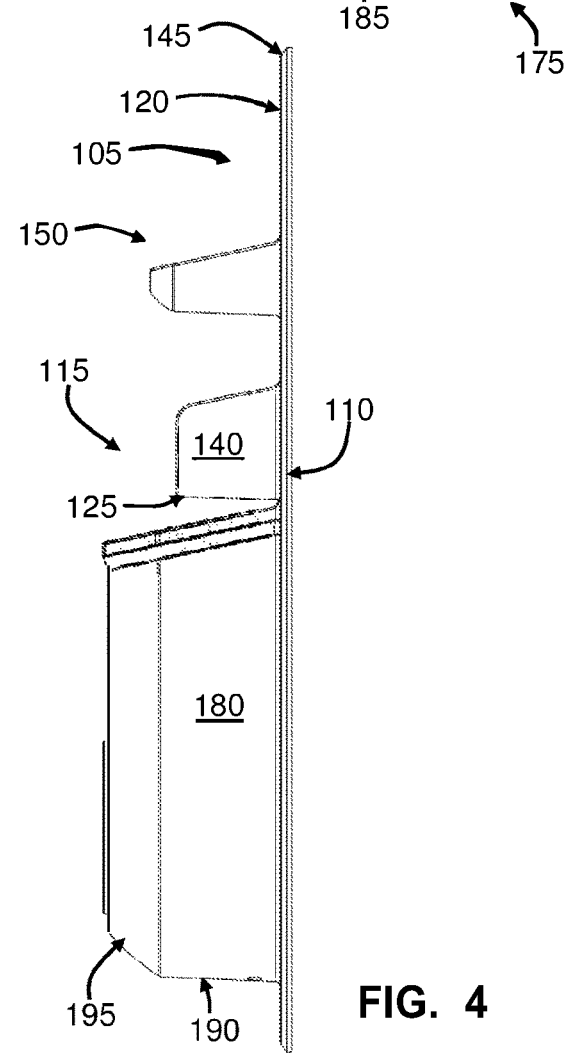
FIG. 4 illustrates a right side view of the toiletry holder of FIG. 1.
Figure 5:
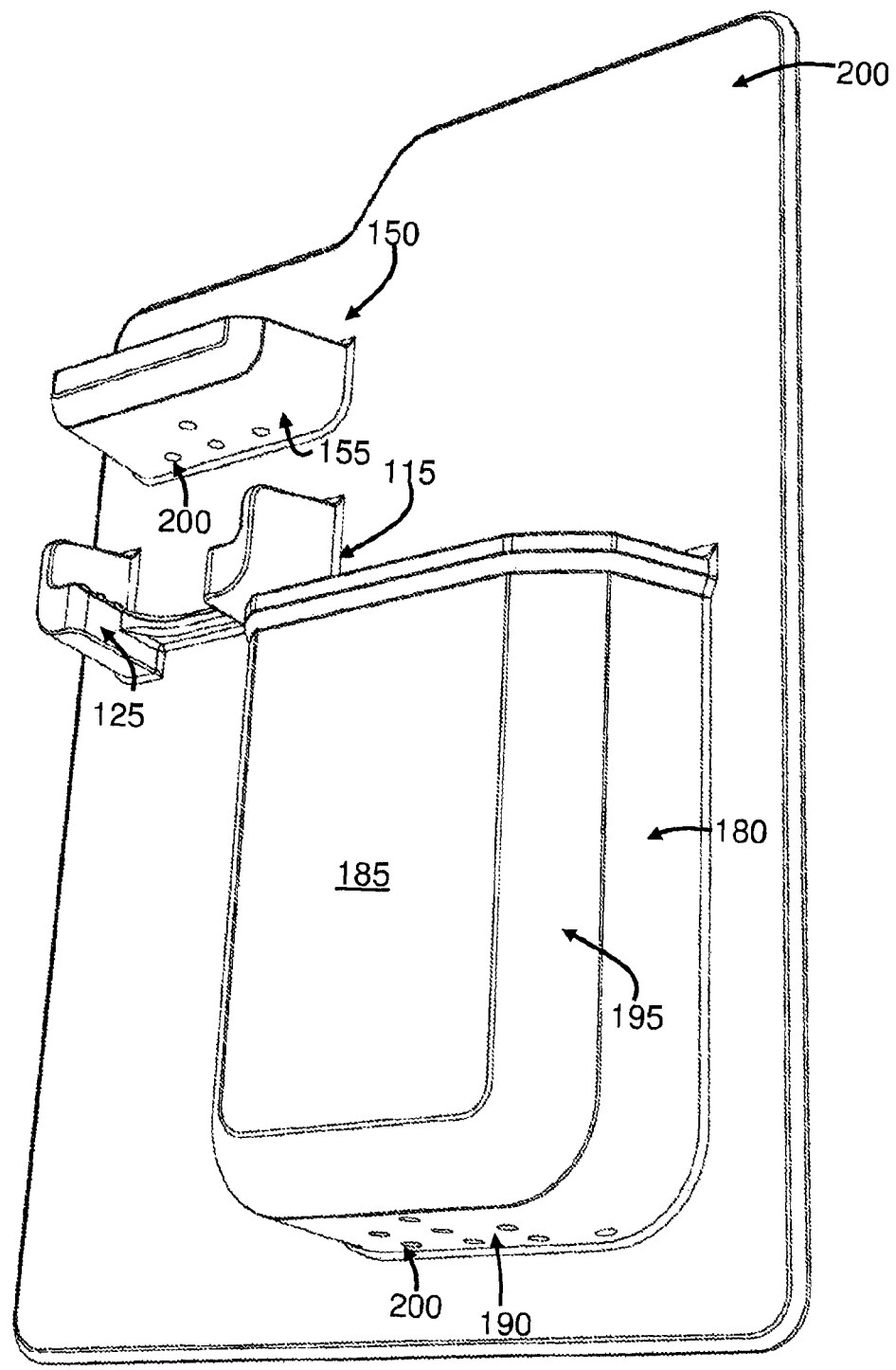
FIG. 5 illustrates a lower perspective view of the toiletry holder of FIG. 1.
Figure 6:
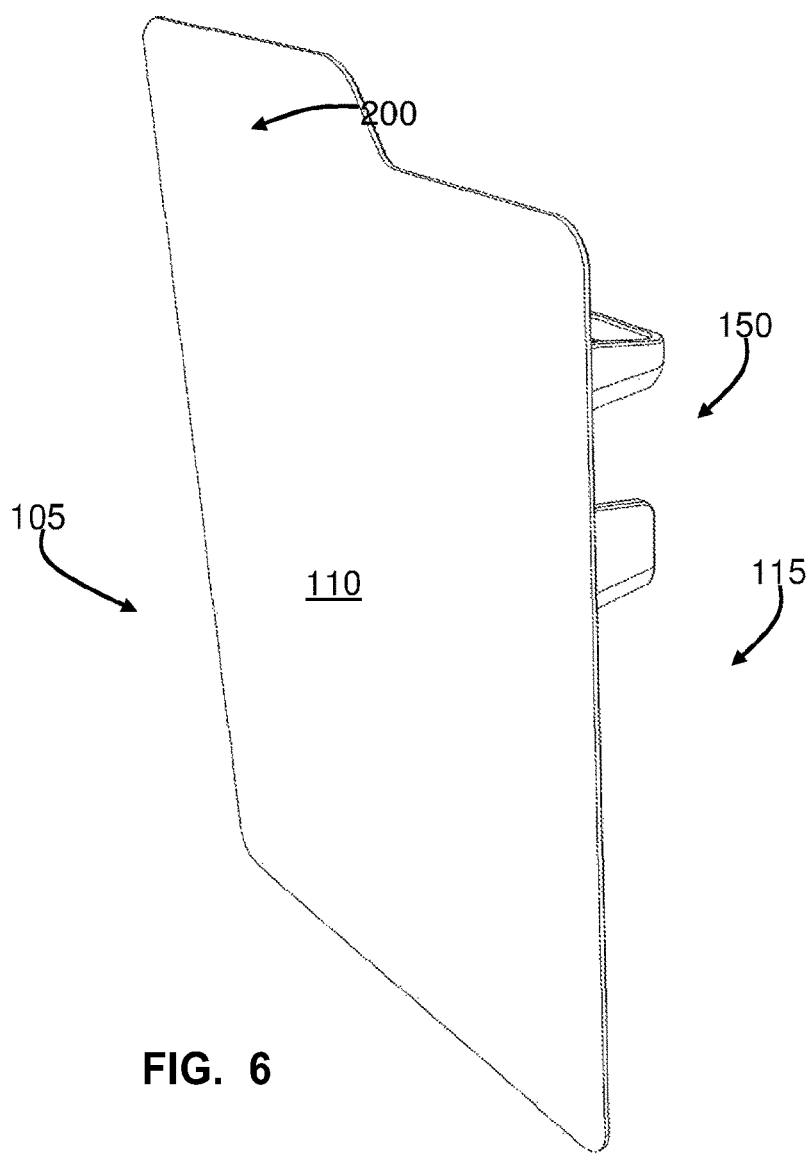
FIG. 6 illustrates an upper rear perspective view of the toiletry holder of FIG. 1.

The toiletry holder 100 includes a substantially planar body 105, which is configured to releasably attach to a flat surface, such as a mirror, glass panel, tile or the like. As best illustrated in FIGS. 3 and 4 and 6, a rear surface 110 of the body 105 is planar and glossy, and is configured to releasably adhere to surfaces, such as glass, tiles, mirrors, Perspex, plastic surfaces and the like.

A retainer in the form of a razor support member 115 extends outwardly from a front surface 120 of the body 105. The razor support member 115 comprises parallel arms 125 that extend perpendicularly from the front surface 120, and form upper support surfaces 130 that are on a common plane.

The upper support surfaces 130 are configured to support respective sides of a head of a razor (not illustrated), while a handle of the razor extends downwardly and between the arms 125. Furthermore, the upper support surfaces 130 include a plurality of elongate protuberances 135, which serve to lift a lower edge of the razor head from the arms 125. As a result, water can more easily flow off the razor head, assisting it in drying the razor.

Figure 2:
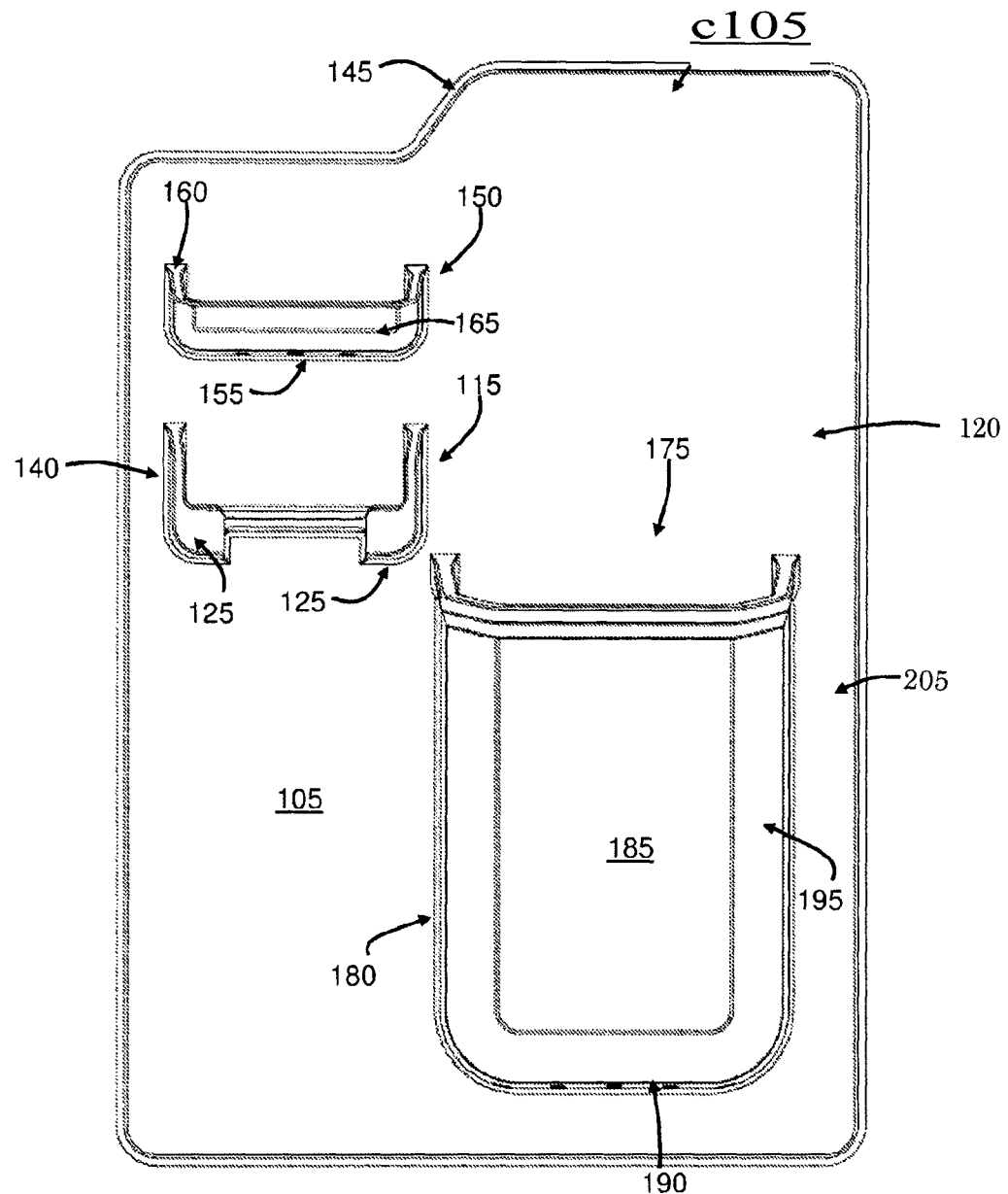
FIG. 2 illustrates a front view of the toiletry holder of FIG. 1.

The arms 125 are supported by respective vertical flanges 140, which extend outwardly from the front surface 120 and along each of the arms 125, providing support for the arms 125. The vertical flanges 140 also prevent the head of the razor from moving laterally, and can thus prevent the head of the razor falling down between the arms 125. As best illustrated in FIG. 2, the vertical flanges 140 are substantially parallel with each other.

A further retainer in the form of a ring holder 150 also extends outwardly from a front surface 120 of the body 105. The ring holder 150 comprises a base 155, parallel arms 160 that extend perpendicularly from the front surface 120 and upwardly from respective edges of the base 155, and a front 165, which extends upwardly from a front portion of the base 155 and between end portions of the arms 125.

The base 155 of the ring holder 150 comprises a substantially planar support surface for receiving a ring, such as a wedding ring, and is surrounded by substantially vertical walls of the arms 160 and the front 165. As such, when a ring is stored on the ring holder the ring is prevented from sliding off by the walls, even if the toiletry holder 100 is bumped or if water sprays directly onto the ring.

The base 155 includes a plurality of apertures, to provide drainage from the ring holder 150. As such, the toiletry holder 100 can be used in the shower without collecting water.

As is best illustrated in FIG. 3, the parallel arms 160 and the front 165 are joined by a bevelled edge portion 170. In particular, the parallel arms 160 join the bevelled edge portion 170 at an angle of approximately 45 degrees, and the bevelled edge portion 170 joins the front 165 at an angle of approximately 45 degrees, such that the front 165 is approximately perpendicular to the parallel arms 160.

As best illustrated in FIG. 4, upper surface of the arms 160 are sloping downwards away from the body 105. This provides an aesthetically pleasing holder, which also provides additional support at a rear of the ring holder 150, where stress from a weight of the ringer holder 150 and ring is greatest.

Another retainer, in the form of a toothbrush pocket 175, for retaining a tube of toothpaste, also extends outwardly from a front surface 120 of the body 105 and is configured to receive a toothbrush and a tube of toothpaste.

The pocket 175 comprises substantially parallel sidewalls 180 that extend outwardly from the body 105, a front 185 and a base 190. The sidewalls 180 extend perpendicularly from the front surface of the body 105, and the front extends between end portions of the sidewalls 180. The sidewalls 180 and the front 185 extend upwardly from respective edges of the base 190 to define the pocket 175.

As is best illustrated in FIG. 3, the parallel arms 180 and the front 185 are joined by a bevelled edge portion 195, the bevelled edge portion 195 similar to the bevelled edge portion 170 of the ring holder 150. In particular, the parallel arms 180 join the bevelled edge portion 195 at an angle of approximately 45 degrees, and the bevelled edge portion 195 joins the front 185 at an angle of approximately 45 degrees, such that the front 185 is approximately perpendicular to the parallel arms 180.

The ring holder 150 and the pocket 175 include drainage apertures 200. Each of the ring holder 150 and the pocket 175 include a plurality of drainage apertures, to prevent water from being contained in the ring holder 150 and pocket respectively.

The ring holder 150 is located above the razor holder 115, and the pocket 175 is located beside the ring holder 150 and the razor holder 150. As such, the toiletry holder 100 is compact.

As best illustrated with reference to FIGS. 3 and 4, an edge 145 of the body 105 is sloping from the rear surface 110 to the front surface 120, such that when water runs down the glass or tiles, it is deflected towards the front surface 120 and thus away from the glass or tiles. This helps prevent the toiletry holder 100 from falling off the glass or tiles when water runs over it.

As discussed above, the rear surface 110 is glossy, which enables the body 105 to releasably adhere to surfaces. The glossy rear enables a seal to be achieved between the rear surface 110 and the surface which the toiletry holder 100 is being attached, by creating a partial vacuum (negative pressure) behind the rear surface 110.

The retainers (i.e. the razor support 115, the ring holder 150 and the pocket 175) are centrally located on the body 105, and the front surface 120 of the body 105 forms a peripheral edge 205 around retainers. This peripheral edge 205 assists in providing a strong bond to the surface, as it prevents force that is applied to any of the retainers from being translated directly to an edge of the body 105. Instead, any force to the retainers is applied to a central portion of the body 105, where the force required to break the vacuum holding the body to the surface is higher. Furthermore, any water sprayed onto the toiletry holder 100 that hits the pocket (or other retainers) from the side, is directed down onto a front of the peripheral edge 205 (or away from the peripheral edge 205), rather than be directed onto the edge between the toiletry holder 100 and the surface on which it is attached.

The peripheral edge 205 varies in thickness, but is at least 10 mm thick around the periphery. Generally, a thickness of at least 5 mm is preferable to provide a strong bond, and more preferably at least 10 mm.

The other surfaces, including a front surface 120 of the toiletry holder 100 are matt, and do not adhere to surfaces or otherwise. In particular, a seal cannot be achieved due to small irregularities in the surface. These irregularities are generally not visible to the naked eye, but instead provide the appearance of a matt (non-glossy) surface due to light deflection caused by the irregularities.

This combination of a glossy rear surface and matt (non-glossy) other surfaces enables the toiletry holder 100 to be releasably attached to tiles and other surfaces, without having any glossy surfaces exposed, which may attract dirt, hair and the like. Furthermore, the matt surface is aesthetically pleasing.

The glossy and matt (non-glossy) surfaces are achieved using glossy (polished) and matt (non-polished) surfaces when moulding the toiletry holder 100.

The toiletry holder 100 is unitarily formed of silicone. This provides structural integrity, reduces risk of damage at joins, and simplifies cleaning. Furthermore, silicone is aesthetically attractive.

While having a substantially rectangular shape, the toiletry holder 100 has curved corners, which provides an aesthetically attractive toiletry holder 100.

The body 105 further includes a tab 200, which provides a gripping surface for holding the toiletry holder 100, and the tab 200 simplifies removal of the toiletry holder 100 from a surface as it provides a wide area for the user to grip onto with their fingers.

The tab 200 also functions as an alignment member, for aligning with corresponding tabs 200 of other objects to be installed adjacent to the toiletry holder 100. For example, a mirror (not illustrated) may include a corresponding tab 200, such that the tabs 200 engage with each other and which serves to align the mirror with the toiletry holder 100.

The toiletry holder 100 is advantageously formed using moulding of liquid silicone rubber. This enables the toiletry holders 100 to be produced inexpensively and in high volume.

The skilled addressee will readily appreciate that alternatives to silicone may be used, including elastomers that are elastic and have a high failure strain, which includes rubber-like and silicone-like products.

According to certain embodiments, the silicone may be treated using antibacterial or antifungal chemicals. In particular, chemicals may be mixed into a liquid silicone rubber prior to moulding. However, the skilled addressee will readily appreciate that the toiletry holder 100, even without the addition of chemicals, has a certain resistance against bacteria and mould growth as the silicone does not retain any water, and the toiletry holder 100 is configured to dry quickly and not retain any water.

The razor support member 115 is specifically shaped to allow a very wide variety of hand held razors to fit. However, the skilled addressee will readily appreciate that variations of the razor support member 115 may be used, including a wider gap between arms 125, wider support surfaces 130 and the like.

The body 105 is primarily about 1 mm thick, about 60 mm wide and about 145 mm wide and about 215 mm long. The pocket is about 90 mm long, 65 mm wide, and 35 mm deep.

Advantageously, the toiletry holder 100 can be used to grip to shiny surfaces like glass, mirror and tiles, without requiring adhesives, suction caps or permanent mounts. In particular, the toiletry holder 100 may be applied to surfaces as many times as you like and it will not lose grip. As such, the toiletry holder 100 is particularly suited to use in motels, hotels and other temporary accommodation, as well as semi-permanent installation in bathrooms, such as on mirrors or in showers.

The toiletry holder 100 is easy to clean and hygienic. For example, as the toiletry holder 100 sits flush against the glass, tiles or mirror on which it is attached, dirt and grime cannot build up behind the toiletry holder 100. Furthermore, the toiletry holder 100 may be cleaned by rinsing it under warm or hot water, or by placing it in a dishwasher, without removing any adhesive properties of the holder.

An alternative embodiment of the present invention is described below in the form of a razor holder.

Figure 7:
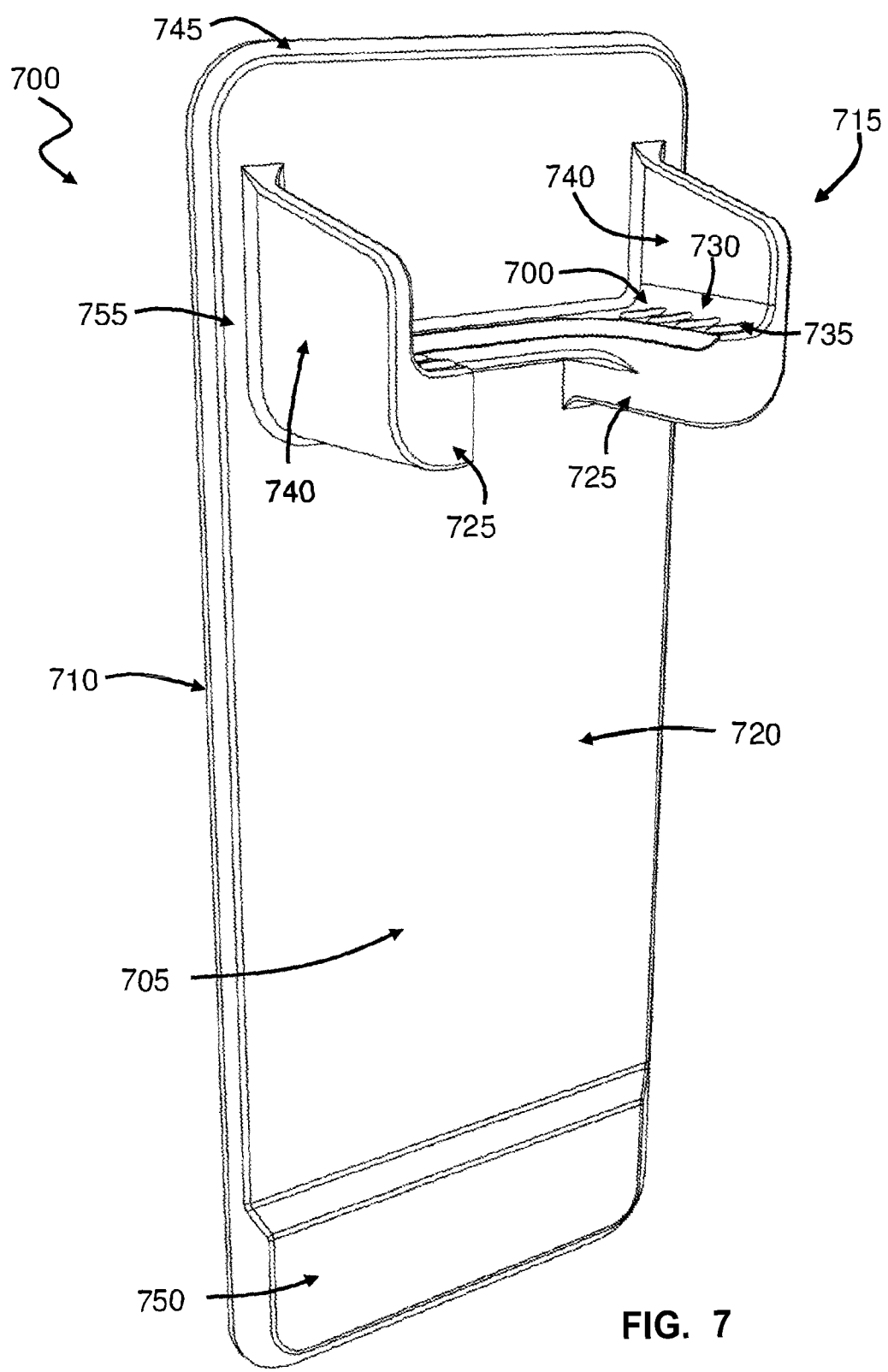
FIG. 7 illustrates an upper perspective view of a razor holder, according to an embodiment of the present invention.

FIG. 7 illustrates an upper perspective view of a razor holder 700, according to an embodiment of the present invention. The razor holder 700 provides a non-permanent, handy and hygienic place to store a razor in the shower (e.g. on a tile, glass or other flat surface) or above the sink (e.g. on a tile or mirror).

Figure 10:
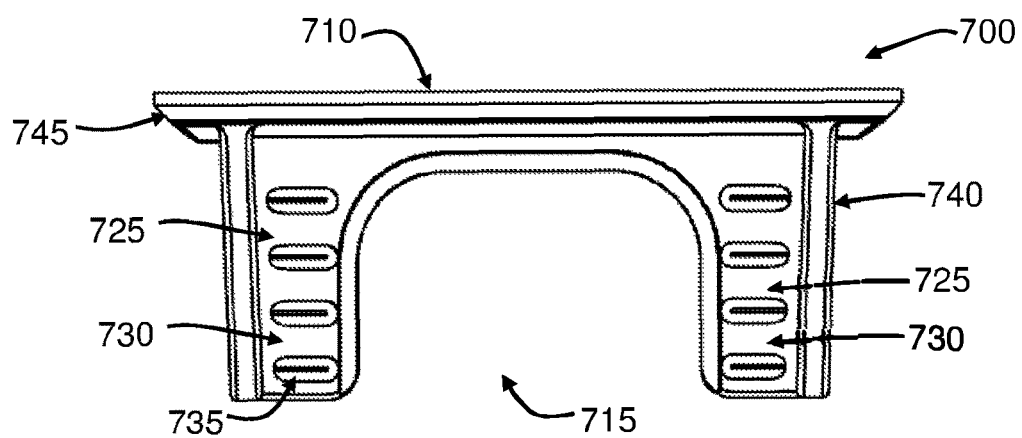
FIG. 10 illustrates a top view of the razor holder of FIG. 7.
Figures 8, 9:
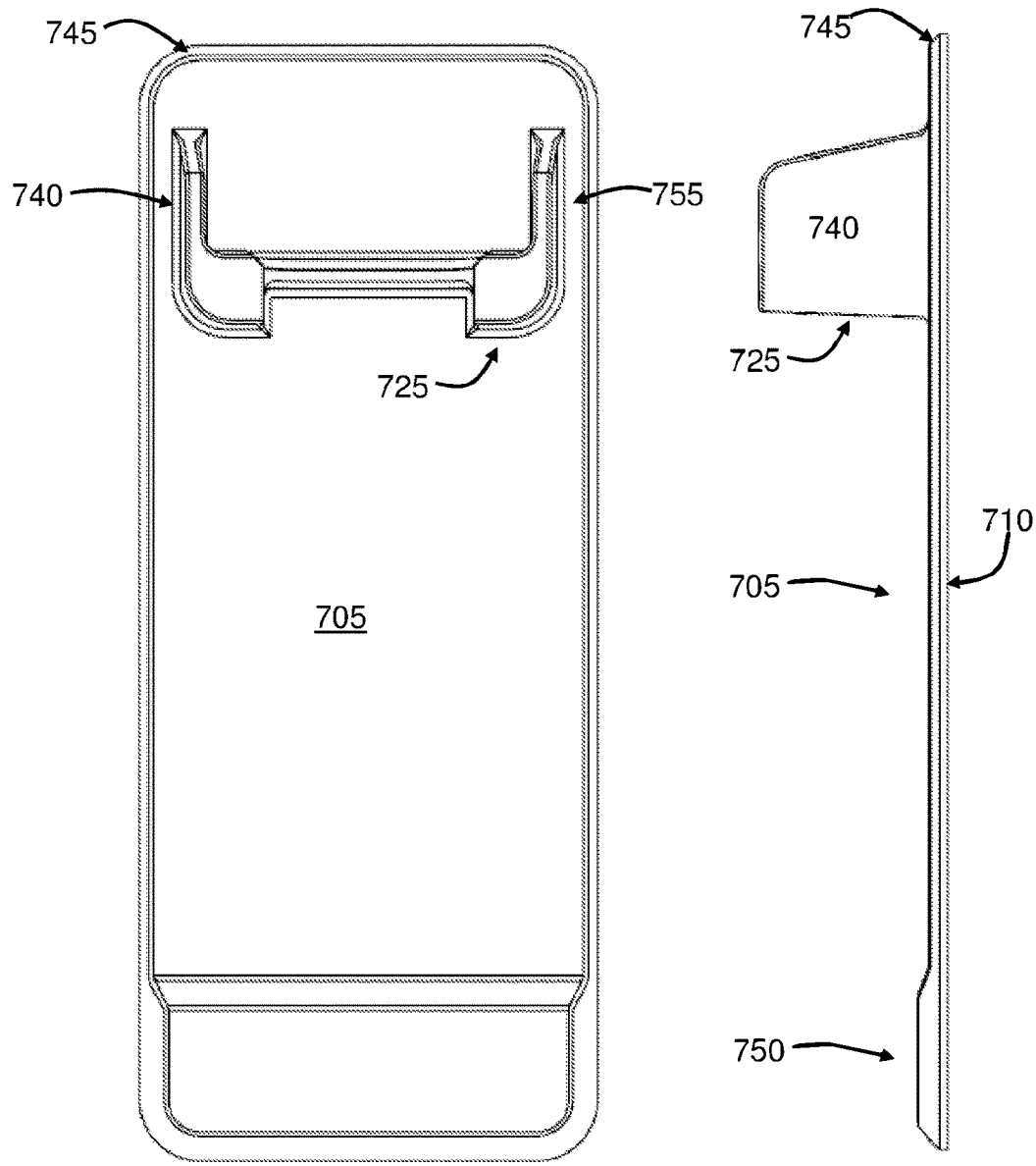
FIG. 8 illustrates a front view of the razor holder of FIG. 7.
FIG. 9 illustrates a right side view of the razor holder of FIG. 7.

The razor holder 700 includes a substantially planar, rectangular shaped body 605, which is configured to releasably attach to a flat surface, such as a mirror, glass panel, tile or the like. As best illustrated in FIGS. 9 and 10, a rear surface 710 of the body 705 is planar and glossy, and is configured to releasably adhere to surfaces, such as glass, tiles, mirrors, plastic surfaces and the like.

A retainer in the form of a razor support member 715 extends outwardly from a front surface 720 of the body 705. The razor support member 715 comprises parallel arms 725 that extend perpendicularly from the front surface 720, and form upper support surfaces 730 that are on a common plane.

The upper support surfaces 730 are configured to support respective sides of a head of a razor (not illustrated), while a handle of the razor extends downwardly and between the arms 725. Furthermore, the upper support surfaces 730 include a plurality of elongate protuberances 735, which serve to lift a lower edge of the razor head from the arms 725. As a result, water can more easily flow off the razor head, assisting it in drying the razor.

The arms 725 are supported by respective vertical flanges 740, which extend outwardly from the front surface 720 and along each of the arms 725, providing support for the arms 725. The vertical flanges 735 also prevent the head of the razor from moving laterally, and can thus prevent the head of the razor falling down between the arms 725. As best illustrated in FIG. 8, the vertical flanges 740 are parallel with each other.

As best illustrated with reference to FIGS. 9 and 10, an edge 745 of the body 705 is sloping from the rear surface 710 to the front surface 720, such that when water runs down the glass or tiles, it is deflected towards the front surface 720 and thus away from the glass or tiles. This helps prevent the razor holder 700 from falling off the glass or tiles when water runs over it.

The razor support member 715 is centrally located on the body 705, and the front surface 720 of the body 705 forms a peripheral edge 755 around the member 715. As discussed above, this peripheral edge 755 assists in providing a sturdy bond between the razor holder and the surface.

A lower portion 750 of the front surface 720 is thicker than the remainder of the body 705, to move the handle of the razor away from the wall, when in use. This is particularly advantageous when razors have long handles, as it prevents the handle from touching the wall on which the razor holder 700 rests.

As discussed above, the rear surface 710 is glossy, which enables the body 705 to releasably adhere to surfaces. The glossy rear enables a seal to be achieved between the rear surface 710 and the surface which the razor holder 700 is being attached, by creating a partial vacuum (negative pressure) behind the rear surface 710.

The other surfaces, including a front surface of the razor holder 700 are matt, and do not adhere to surfaces or otherwise. This combination of a glossy rear surface and matt (non-glossy) other surfaces enables the razor holder 700 to be releasably attached to tiles and other surfaces, without having any glossy surfaces exposed, which may attract dirt, hair and the like. Furthermore, the matt surface is aesthetically pleasing.

The razor holder 700 is unitarily formed of silicone. This provides structural integrity, reduces risk of damage at joins, and simplifies cleaning. Furthermore, silicone is aesthetically attractive.

While the razor holder 700 is described above as having a substantially rectangular shape, the razor holder 700 has curved corners, which provides an aesthetically attractive razor holder 700.

According to certain embodiments, and as discussed above, the silicone may be treated using antibacterial or antifungal chemicals. Similarly, the skilled addressee will readily appreciate that alternatives to silicone may be used, including elastomers that are elastic and have a high failure strain, which includes rubber-like and silicone-like products.

The razor support member 715 is specifically shaped to allow a very wide variety of hand held razors to fit. However, the skilled addressee will readily appreciate that variations of the razor support member 715 may be used, including a wider gap between arms 725, wider support surfaces 730 and the like.

The body 705 is primarily about 1 mm thick, about 60 mm wide and about 145 mm long. The arms 725 extend outwardly from the body about 22 mm.

According to certain embodiments (not illustrated), a small mirror is embedded in the body 705. The mirror may be located adjacent the razor support member 715, and enable use of the mirror when the razor is used.

An alternative embodiment of the present invention is described below in the form of an elastomeric holder including a mirror.

Figure 11:
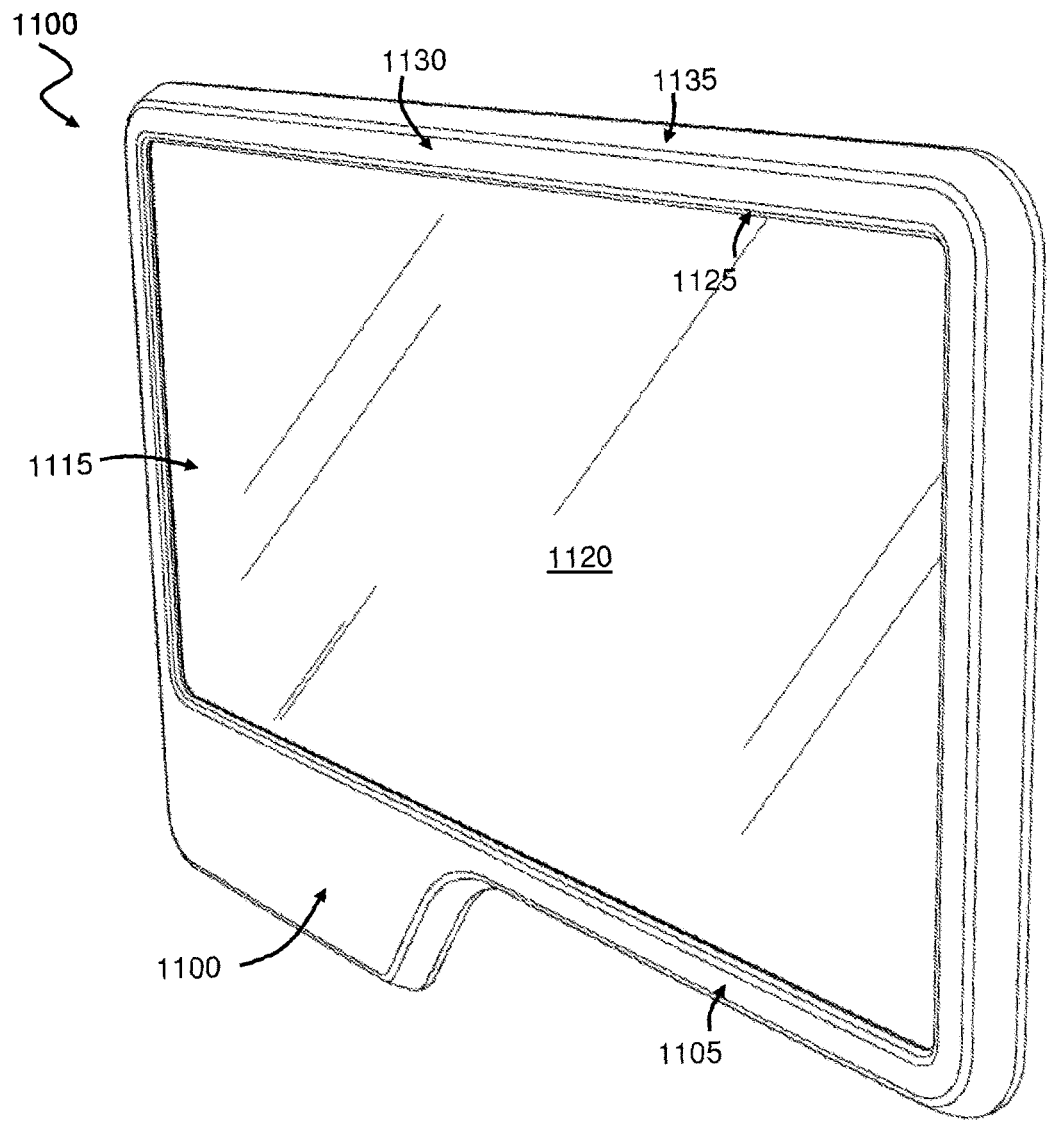
FIG. 11 illustrates a front perspective view of a portable mirror, according to an embodiment of the present invention.
Figure 12:
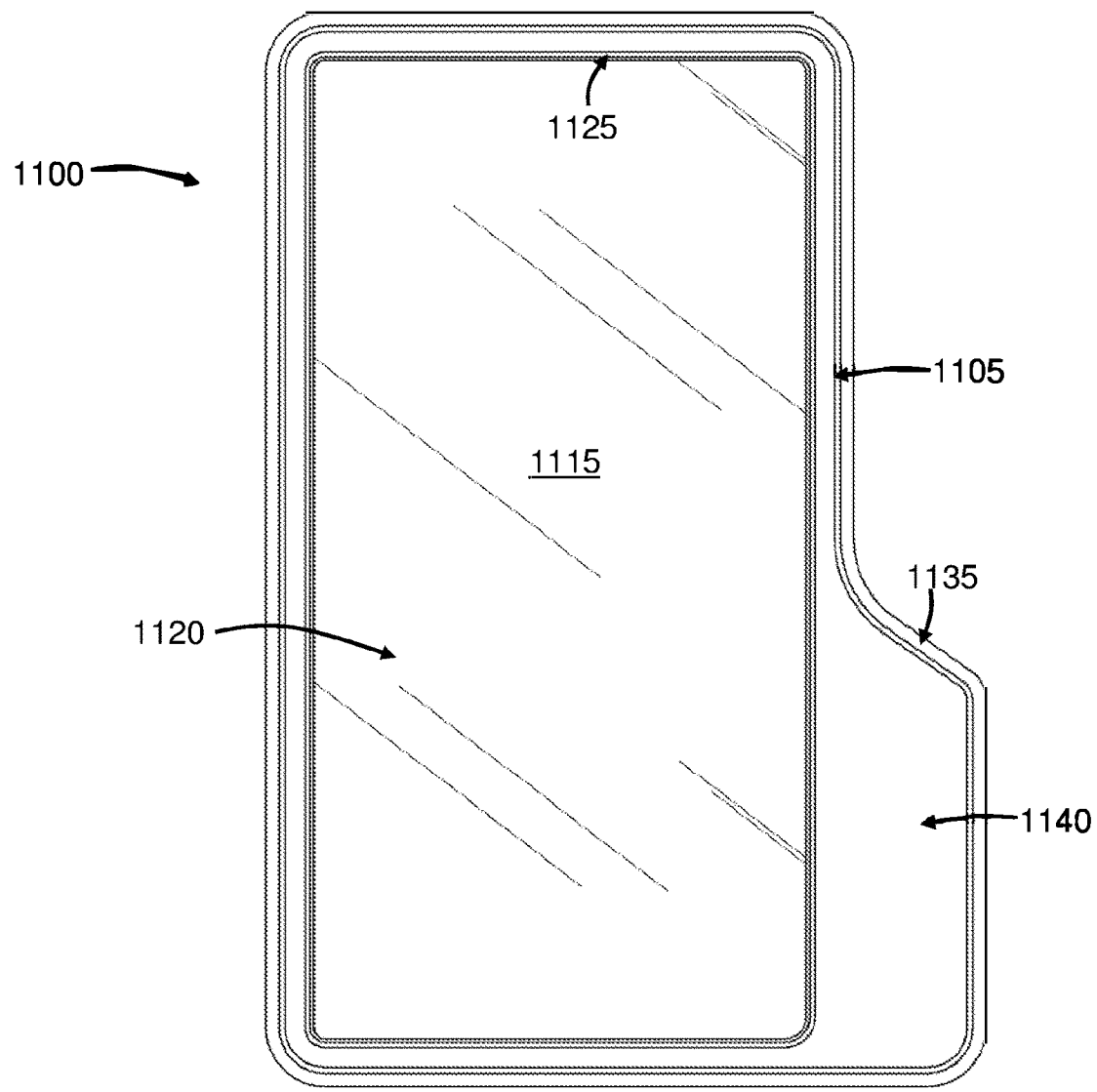
FIG. 12 illustrates a front view of the mirror of FIG. 11.

FIG. 11 illustrates a portable mirror 1100, according to an embodiment of the present invention. The portable mirror 1100 provides a non-permanent, handy and hygienic mirror for placement in the shower (e.g. on a tile, glass or other flat surface) or other suitable surface.

Figure 13:
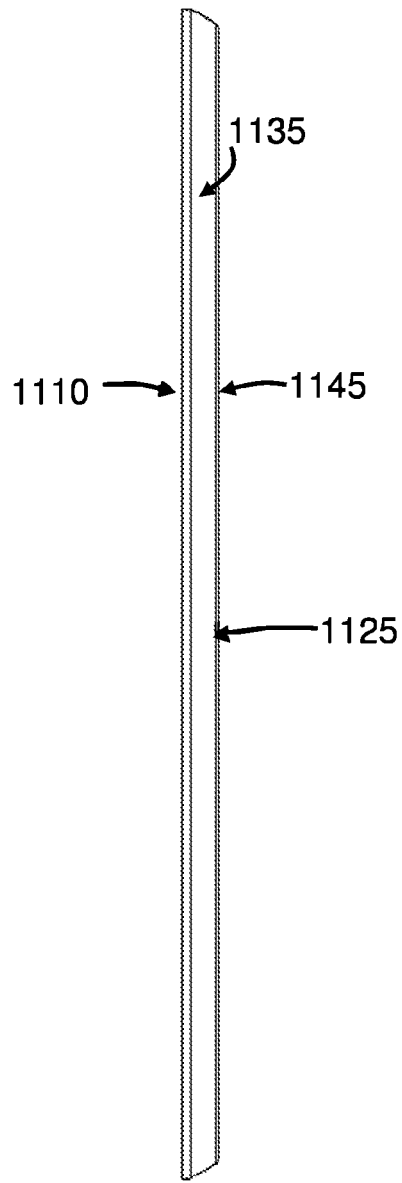
FIG. 13 illustrates a top view of the mirror of FIG. 11.
Figure 14:
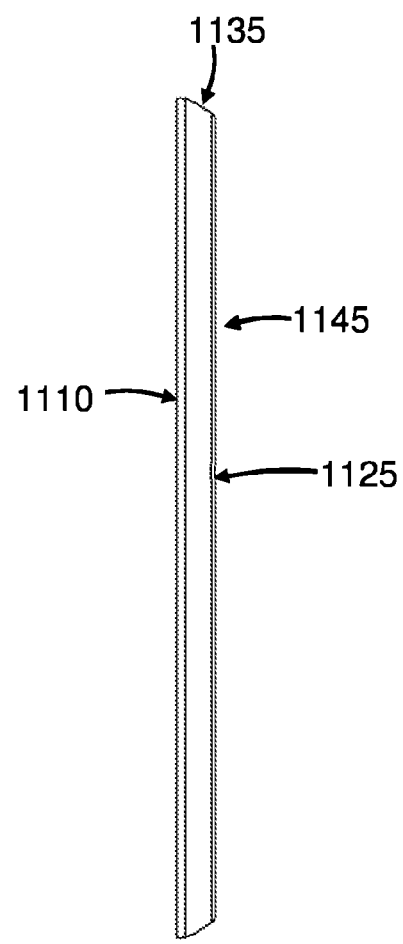
FIG. 14 illustrates a left view of the mirror of FIG. 11.

The mirror 1100 includes a substantially planar, rectangular shaped body 1105, which is configured to releasably attach to a flat surface, such as a glass panel, tile or the like. As best illustrated in FIGS. 13 and 14, a rear surface 1110 of the body 1105 is planar and glossy, and is configured to releasably adhere to surfaces, such as glass, tiles, mirrors, plastic surfaces and the like.

The mirror 1100 further includes a mirror element 1115 that is partially encased by the body 1105, such that corners and edges of the mirror are covered by the body 1105. A substantial portion of a reflective surface 1120 of the mirror element 1115 is visible.

In particular, the body 1105 includes a retainer in the form of an opening 1125, for receiving the mirror element 1115, which enables the mirror element 1115 to be removed and reinserted into the body 1105. The body 1105 is stretched over the mirror element 1115 such that it fits snugly around the mirror element 1115. This enables various types of mirror elements 115, such as mirror elements 115 with different magnifications, to be installed in the body 1105 as needed. This further simplifies manufacture, as the same body 1105 may be made independently of the mirror element 1115.

The body includes lips 1130 that extend around a periphery of the mirror element, and approximately 1 mm over the edges of the mirror element 1115. Providing lips 1130 which are about 1 mm, has been found to be sufficient in retaining the mirror element 1115 in the body 1105, while providing a maximum useful area of the mirror element 1115.

The body 1105 further includes a tab 1140, which provides a gripping surface for holding the mirror 1100, without having to touch the mirror element 1115 and thus put fingerprints thereon. Furthermore, the tab 1140 simplifies removal of the mirror 1100 from a surface as it provides a wide area for the user to grip onto with their fingers.

The tab 1140 also functions as an alignment member, for aligning with corresponding tabs 1140 of other objects to be installed adjacent to the mirror 1100. For example, a razor or toothbrush holder may include a corresponding tab 1140, such that the tabs 1140 engage with each other.

According to certain embodiments, the mirror element 1115 includes a corresponding mirror tab (not illustrated), which extends into the tab 1140, providing rigidity and support to the tab 1140. In particular, the mirror element 1115 is rigid, and as such, provides rigidity to the tab 1140.

The mirror element 1115 includes an anti-fog coating, which is particularly useful when being used in the shower. The anti-fog coating may, for example, be formed from a surfactant or hydrophilic surface, as is known in the art of anti-fog mirrors.

The mirror element is advantageously made of polycarbonate, which is strong, lightweight, and does not easily shatter like glass. Alternatively, the mirror may be formed of an acrylic or any other suitable rigid, impact-resistant, non-metallic, and/or non-glass material.

Preferably, the body is substantially planar. Suitably, the body is primarily about 1 mm thick. Suitably, the body is about 80 mm wide and about 145 mm long.

Preferably, an edge 1135 of the body 1105 is sloping from a rear surface 1110 of the body 1105 to a front surface 1145. As such, when water runs down the surface on which the mirror 1100 is attached, it is deflected away from that surface, which helps prevent the mirror 1100 from falling off the surface.

According to certain embodiments, the tabs 1140 include indicia in the form of branding or advertising. As such, the mirrors 1100 may be specifically suited for promotional purposes.

As discussed above, the rear surface 1110 is glossy, which enables the body 1105 to releasably adhere to surfaces. The glossy rear enables a seal to be achieved between the rear surface 110 and the surface which the mirror 1100 is being attached, by creating a partial vacuum (negative pressure) behind the rear surface 1110.

The other surfaces, including a front surface of the body 1105, are matt, and do not adhere to surfaces or otherwise. In particular, a seal cannot be achieved due to small irregularities in the surface. These irregularities are generally not visible to the naked eye, but instead provide the appearance of a matt (non-glossy) surface due to light deflection caused by the irregularities.

This combination of a glossy rear surface 1110 and matt (non-glossy) other surfaces enables the mirror 1100 to be releasably attached to tiles and other surfaces, without having any glossy surfaces exposed, which may attract dirt, hair and the like. Furthermore, the matt surface is aesthetically pleasing.

The glossy and matt (non-glossy) surfaces are achieved using glossy (polished) and matt (non-polished) surfaces when moulding the body 1105.

The body 1105 is unitarily formed of silicone. This provides structural integrity, reduces risk of damage at joins, and simplifies cleaning. Furthermore, this provides an aesthetically attractive mirror.

While the mirror 1100 is described above as having a substantially rectangular shape, the body 1105 has curved corners. This not only provides an aesthetically attractive mirror, but also helps distribute force if the mirror is dropped on one of the corners.

The body 1105 is advantageously formed using moulding of liquid silicone rubber. This enables the body 1105 to be produced inexpensively and in high volume.

The skilled addressee will readily appreciate that alternatives to silicone may be used, including elastomers that are elastic and have a high failure strain, which includes rubber-like and silicone-like products.

According to certain embodiments, the silicone may be treated using antibacterial or antifungal chemicals. In particular, chemicals may be mixed into a liquid silicone rubber prior to moulding. However, the skilled addressee will readily appreciate that the body 1105, even without the addition of chemicals, has a certain resistance against bacteria and mould growth as the silicone does not retain any water, and the mirror 1100 is configured to dry quickly and not retain any water.

Advantageously, the mirror 1100 can be used to grip to shiny surfaces like glass, mirror and tiles, without requiring adhesives, suction caps or permanent mounts. In particular, the mirror 1100 may be applied to surfaces as many times as you like and it will not lose grip. As such, the mirror 1100 is particularly suited to use in motels, hotels and other temporary accommodation, as well as semi-permanent installation in bathrooms, such as on other mirrors or in showers.

The mirror 1100 is easy to clean and hygienic. For example, as the mirror 1100 sits flush against the glass, tiles or mirror on which it is attached, dirt and grim cannot build up behind the mirror 1100. Furthermore, the mirror 1100 may be cleaned by rinsing it under warm or hot water, or by placing it in a dishwasher.

The mirror may be mounted at any height on your wall or mirror in the bathroom, and as such, the user does not have to bend down to shave or put on make up.

An alternative embodiment of the present invention is described below in the form of a shower caddy.

Figure 15:
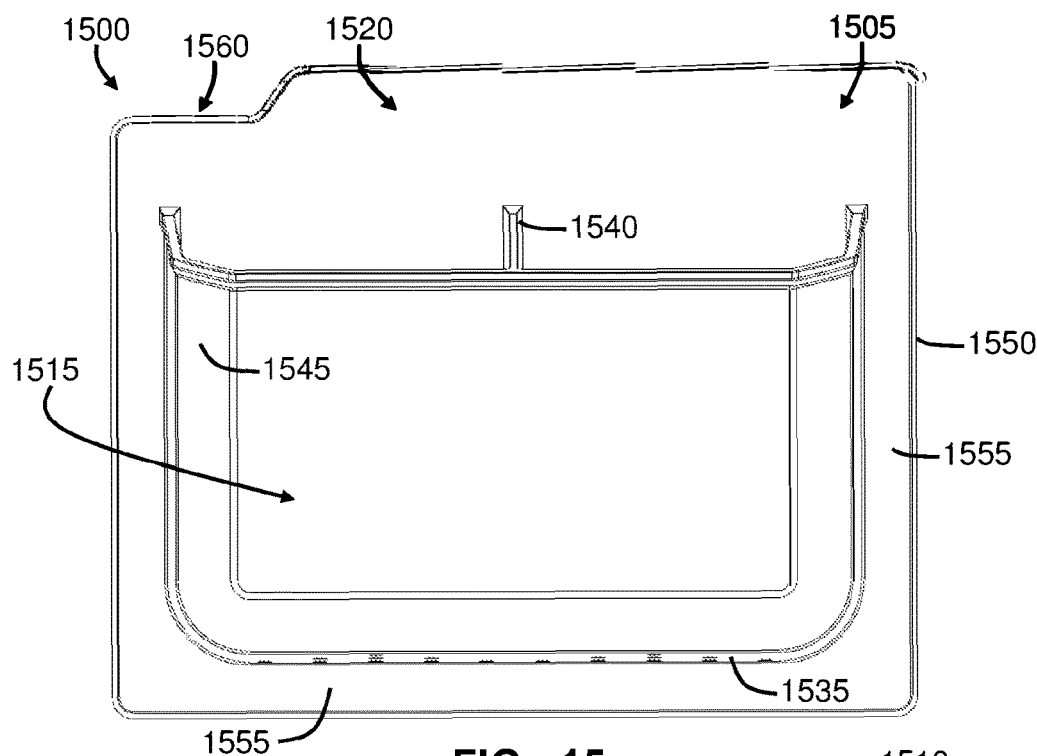
FIG. 15 illustrates a front view of a shower caddy, according to an embodiment of the present invention.
Figure 16:
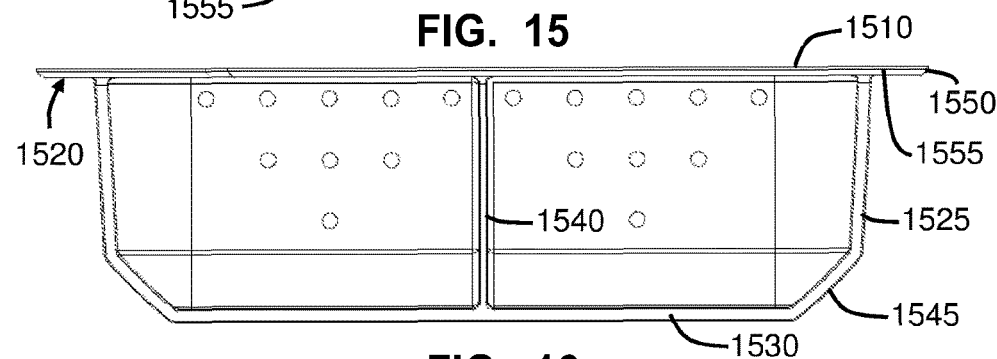
FIG. 16 illustrates a top view of the caddy of FIG. 15.
Figure 17:
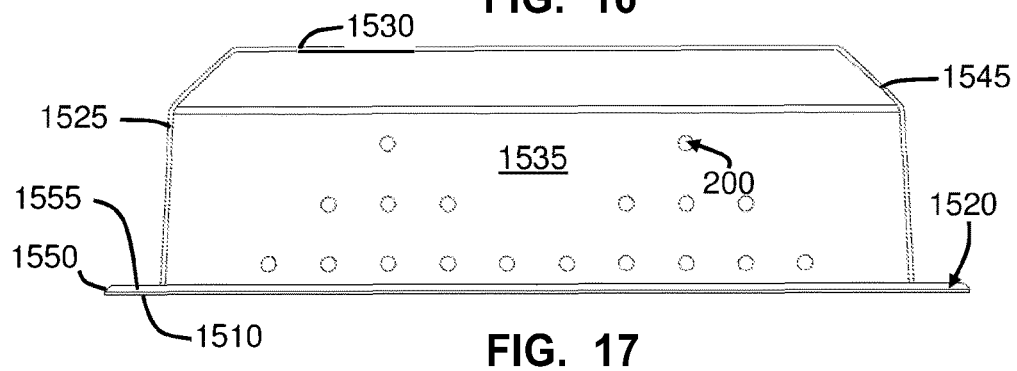
FIG. 17 illustrates a bottom view of the caddy of FIG. 15.
Figure 18:
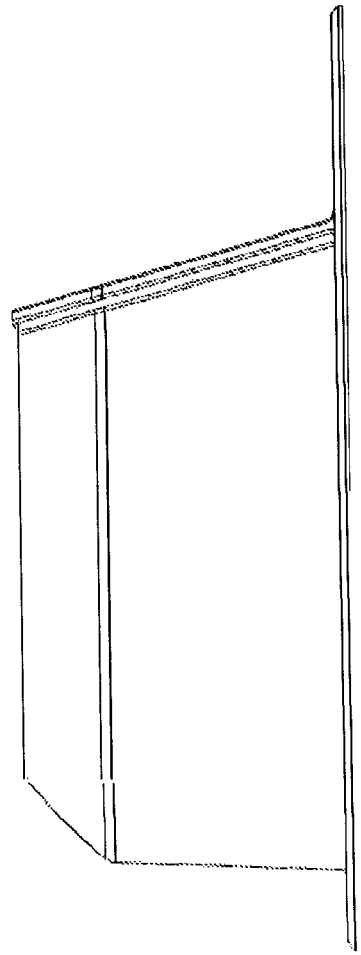
FIG. 18 illustrates a side view of the caddy of FIG. 15.

FIG. 15 illustrates a front view of a shower caddy 1500, according to an embodiment of the present invention. FIG. 16 illustrates a top view of the caddy 1500, FIG. 17 illustrates a bottom view of the caddy 1500, and FIG. 18 illustrates a side view of the caddy 1500.

The shower caddy 1500 provides a non-permanent, handy and hygienic place to store bottles of soap, facewash, shampoo and conditioner, for example, in the shower (e.g. on a tile, glass or other flat surface). The shower caddy 1500 may, however, also be used in the kitchen or laundry to store dishwashing detergent, soap, detergent or the like.

The shower caddy 1500 includes a substantially planar body 1505, which is configured to releasably attach to a flat surface, like the body 105 of the toiletry holder of FIG. 1. In particular, a rear surface 1510 of the body 1505 is planar and glossy, and is configured to releasably adhere to surfaces, such as glass, tiles, mirrors, plastic surfaces and the like.

A storage pocket 1515 also extends outwardly from a front surface 1520 of the body 105 and is configured to receive bottles of soap, shampoo, conditioner and the like. The pocket 1515 comprises substantially parallel sidewalls 1525 that extend outwardly from the body 1505, a front 1530 and a base 1535. The sidewalls 1525 extend perpendicularly from the front surface of the body 105, and the front 1530 extends between end portions of the sidewalls 1525. The sidewalls 1525 and the front 1530 extend upwardly from respective edges of the base 1535 to define the pocket 1515.

The pocket 1515 includes a pocket divider 1540, which is configured to define the pocket 1515 into two equally sized portions 1515*a*, 1515*b*. The pocket divider 1540 is similar to the sidewalls 1525, and defines a right sidewall for the left pocket portion 1515*a* and a left sidewall for the right pocket portion 1515*b*.

As is best illustrated in FIG. 16, the sidewalls 1525 and the front 1530 are joined by a bevelled edge portion 1545, similar to the bevelled edge portion 195 of the toiletries holder 100 of FIG. 1.

Similarly, and as best illustrated with reference to FIGS. 16-18, an edge 1550 of the body 105 is sloping from the rear surface 1510 to the front surface 1520, such that when water runs down or along the glass or tiles, it is deflected towards the front surface 1520 and thus away from the glass or tiles. This helps prevent the shower caddy 1500 from falling off the glass or tiles when water runs over it.

The pocket 1515 is centrally located on the body 1505, and the front surface 1520 of the body 1505 forms a peripheral edge 1555 around the pocket 1515. As discussed above, this peripheral edge 1555 assists in providing a sturdy bond between the razor holder and the surface.

As was the case for the front surface 120 of the toiletries holder, the other surfaces, including the front surface 1520 of the shower caddy 1500 are matt, and do not adhere to surfaces. This combination of a glossy rear surface and matt (non-glossy) other surfaces enables the shower caddy 1500 to be releasably attached to tiles and other surfaces, without having any glossy surfaces exposed, which may attract dirt, hair and the like. Furthermore, the matt surface is aesthetically pleasing.

Similarly, and as was the case for the toiletry holder 100, the shower caddy 1500 is unitarily formed of silicone. This provides structural integrity, reduces risk of damage at joins, and simplifies cleaning. Furthermore, silicone is aesthetically attractive.

Finally, the shower caddy includes an alignment portion 1560, similar to the tab 200, for aligning with corresponding alignment members of other objects to be installed adjacent to the shower caddy 1500. For example, a mirror (not illustrated) may include a corresponding alignment member, such that the alignment members engage with each other to align the mirror with the shower caddy 1500.

An alternative embodiment of the present invention is described below in the form of a make-up caddy.

Figure 22:
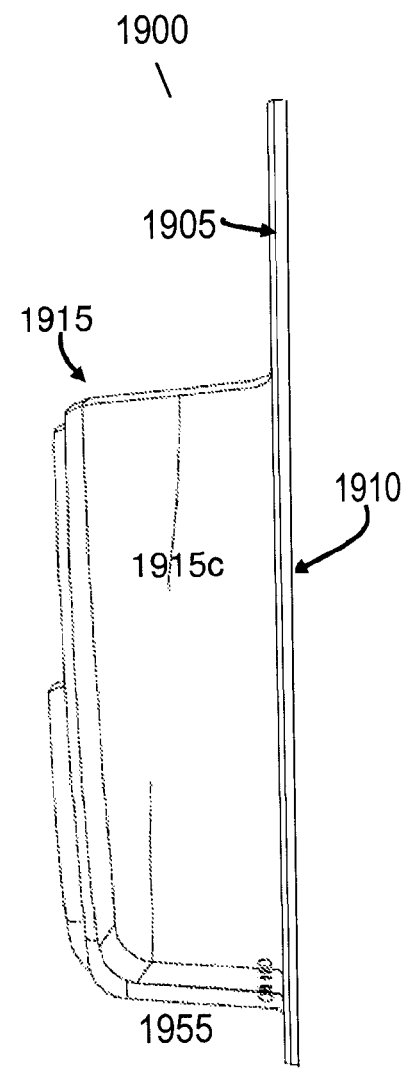
FIG. 22 illustrates a side view of the caddy of FIG. 19.
Figure 19:
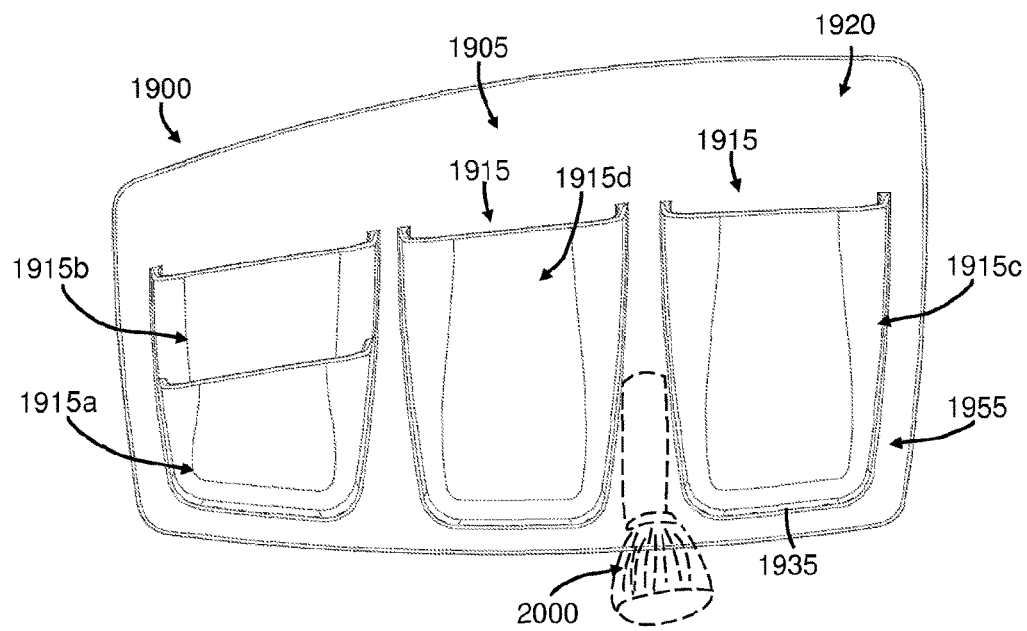
FIG. 19 illustrates a front view of a make-up caddy, according to an embodiment of the present invention.
Figure 20:
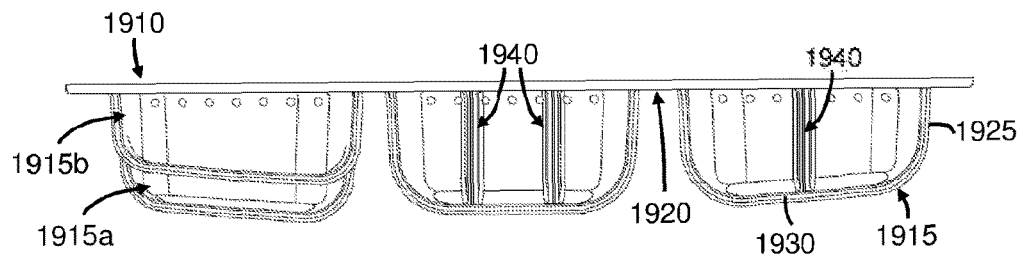
FIG. 20 illustrates a top view of the caddy of FIG. 19.
Figure 21:
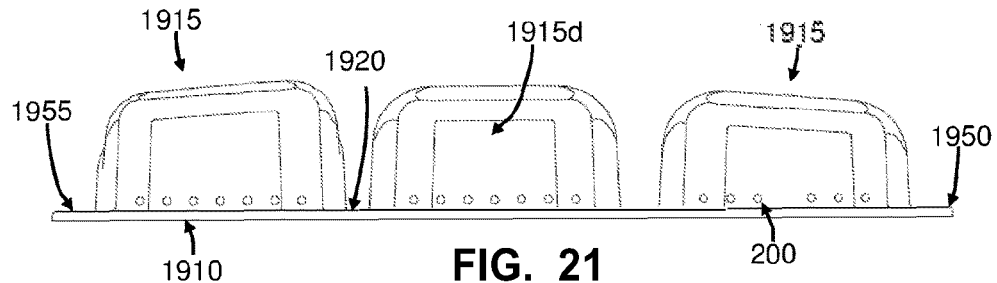
FIG. 21 illustrates a bottom view of the caddy of FIG. 19.

FIG. 19 illustrates a front view of a make-up caddy 1900, according to an embodiment of the present invention. FIG. 20 illustrates a top view of the caddy 1900, FIG. 21 illustrates a bottom view of the caddy 1900, and FIG. 22 illustrates a side view of the caddy 1900.

The make-up caddy 1900 provides a non-permanent, handy and hygienic place to store make-up and make-up accessories, such as make up brushes, a complexion sponge and lipstick, in, for example, a bedroom or bathroom (e.g. on a tile, mirror, glass or other flat surface). The skilled addressee will, however, readily appreciate that the make-up caddy 1900 may be used in any suitable area.

The make-up caddy 1900 includes a substantially planar body 1905, which is configured to releasably attach to a flat surface, like the body 105 of the toiletry holder of FIG. 1. In particular, a rear surface 1910 of the body 1905 is planar and glossy, and is configured to releasably adhere to surfaces, such as glass, tiles, mirrors, plastic surfaces and the like.

A plurality of storage pockets 1915 extend outwardly from a front surface 1920 of the body 1905 and are configured to receive make-up and make-up accessories. Each pocket 1915 comprises substantially parallel sidewalls 1925 that extend outwardly from the body 1905, a front 1930 and a base 1935. The sidewalls 1925 extend perpendicularly from the front surface of the body 1905, and the front 1930 extends between end portions of the sidewalls 1925. The sidewalls 1925 and the front 1930 extend upwardly from respective edges of the base 1935 to define the pockets 1915.

A first pocket 1915a extends outwardly from a front 1930 of a second pocket 1915b, rather than from the body 1905 directly. This provides a multi-tiered pocket arrangement, which allows make-up to be positioned in a tiered arrangement, both in front of and above each other.

A right pocket 1915c includes a pocket divider 1940, which is configured to divide the pocket 1915c into two equally sized portions, similar to the pocket divider 1540 of the shower caddy 1500. Similarly, a central pocket 1915d includes first and second pocket dividers 1940, which are configured to divide the pocket 1915d into three equally sized portions.

The pockets 1915 are arranged such that the spaces between pockets can be used to hold make-up brush upside down to dry. In particular, the sidewalls are arranged such that a tapered holder is formed between the pockets 1915, such that brushes of various thicknesses can be held upside down, as illustrated by brush 2000 in FIG. 19. In particular, an end of the brush 2000 is wedged between the pockets 1915, and friction therebetween holds the brushes in place.

Similar to the sloping edges described above, and as best illustrated with reference to FIGS. 20-22, an edge 1950 of the body 105 is curved, which also assists with water run-off (should the make-up caddy 1900 be exposed to water), but improves the aesthetics of the make-up caddy 1900.

The pockets 1915 are centrally located on the body 1905, and the front surface 1920 of the body 1905 forms a peripheral edge 1955 around the pocket. This peripheral edge 1955 assists in providing a strong bond to the surface, as it prevents force that is applied to the pocket 1915 from being translated directly to an edge of the body 1905, as described above.

As was the case for the front surface 120 of the toiletries holder, the other surfaces, including the front surface 1920 of the make-up caddy 1900 are matt, and do not adhere to surfaces. This combination of a glossy rear surface and matt (non-glossy) other surfaces enables the make-up caddy 1900 to be releasably attached to tiles and other surfaces, without having any glossy surfaces exposed, which may attract dirt, hair and the like. Furthermore, the matt surface is aesthetically pleasing.

Similarly, and as was the case for the toiletry holder 100, the make-up caddy 1900 is unitarily formed of silicone. This provides structural integrity, reduces risk of damage at joins, and simplifies cleaning. Furthermore, silicone is aesthetically attractive.

An alternative embodiment of the present invention is described below in the form of an elastomeric holder including a whiteboard. This embodiment may be similar or identical to mirror embodiments, where the mirror element is replaced by a similarly sized and shaped whiteboard element. In fact, the body 1105 of the mirror 1100 of FIG. 11 may be used to house a similarly shaped a whiteboard element, thereby converting the mirror 1100 of FIG. 11 to a whiteboard.

Figure 23:
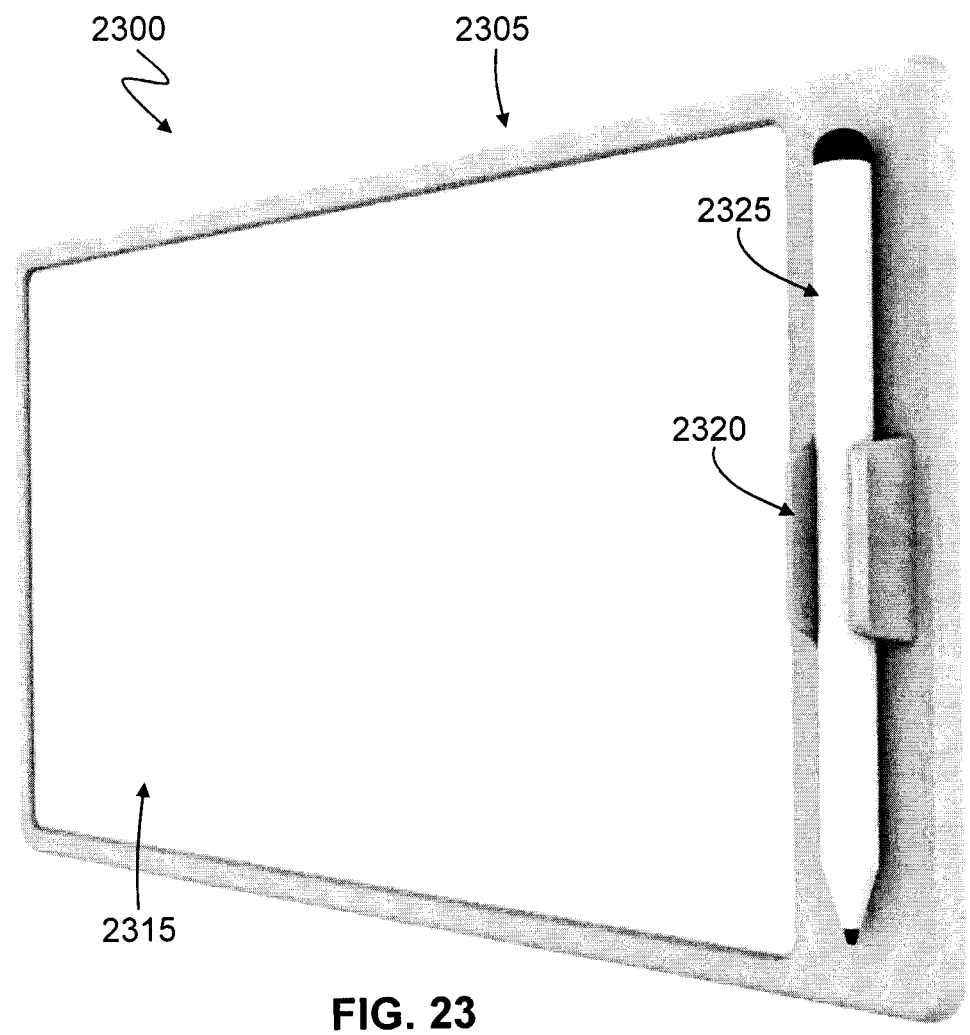
FIG. 23 illustrates a front perspective view of a portable whiteboard, according to an embodiment of the present invention.

FIG. 23 illustrates a portable whiteboard 2300, according to an embodiment of the present invention. The portable whiteboard 2300 provides a non-permanent, handy and hygienic whiteboard for placement in the kitchen (e.g. on a tile, glass or other flat surface) or other suitable surface.

The whiteboard 2300 includes a substantially planar, rectangular shaped body 2305, much like the body 1105, which is configured to releasably attach to a flat surface, such as a glass panel, tile or the like. A rear surface of the body 2305 is planar and glossy, and is configured to releasably adhere to surfaces, such as glass, tiles, mirrors, plastic surfaces and the like in the same manner as the mirror, described above.

The whiteboard 2300 further includes a whiteboard element 2315 that is partially encased by the body 2305, such that corners and edges of the whiteboard element are covered by the body 2305. A substantial portion of a front surface of the whiteboard element 2315 is visible and accessible for use.

In particular, the body 2305 includes a retainer in the form of an opening, for receiving the whiteboard element 2315, which enables the whiteboard element 2315 to be removed and reinserted into the body 2305. The body 2305 is stretched over the whiteboard element 2315 such that it fits snugly around the whiteboard element 2315. This enables various types of elements, such as mirror elements, different whiteboard elements, magnetic boards, and other planar items, to be installed in the body 2305 as needed. This further simplifies manufacture, as the same body 2305 may be made independently of the whiteboard element 2315.

The body includes lips that extend around a periphery of the whiteboard element, and approximately 1 mm over the edges of the whiteboard element 2315, as is described above in relation to the mirror 1100. Providing lips which are about 1 mm, has been found to be sufficient in retaining the whiteboard element 2315 in the body 2305, while providing a maximum useful area of the whiteboard element 2315.

The body 2305 further includes a pen retainer 2320, which comprises first and second retaining members and is configured to receive and retain a pen (marker) 2325. In particular, the pen (marker) 2325 is held between the retaining members by friction, similar to how the brush 2000 is held between the pockets 1915, as outlined above.

The whiteboard element is advantageously made of polycarbonate, acrylic, melamine, painted steel, enameled steel, aluminium, or any other suitable material, and which is preferably strong, rigid, lightweight, impact resistant, and does not easily shatter like glass.

Preferably, the body is substantially planar. Suitably, the body is primarily about 1 mm thick.

As discussed above in relation to other embodiments, the rear surface is glossy, which enables the body 2305 to releasably adhere to surfaces. The glossy rear enables a seal to be achieved between the rear surface and the surface which the whiteboard 2300 is being attached, by creating a partial vacuum (negative pressure) behind the rear surface.

The other surfaces, including a front surface of the body 2305, are matt, and do not adhere to surfaces or otherwise. In particular, a seal cannot be achieved due to small irregularities in the surface. These irregularities are generally not visible to the naked eye, but instead provide the appearance of a matt (non-glossy) surface due to light deflection caused by the irregularities.

This combination of a glossy rear surface and matt (non-glossy) other surfaces enables the whiteboard 2300 to be releasably attached to tiles and other surfaces, without having any glossy surfaces exposed, which may attract dirt, hair and the like. Furthermore, the matt surface is aesthetically pleasing.

The glossy and matt (non-glossy) surfaces are achieved using glossy (polished) and matt (non-polished) surfaces when moulding the body 2305.

The body 2305 is unitarily formed of silicone. This provides structural integrity, reduces risk of damage at joins, and simplifies cleaning. Furthermore, this provides an aesthetically attractive whiteboard.

While the whiteboard 2300 is described above as having a substantially rectangular shape, the body 2305 has curved corners. This not only provides an aesthetically attractive whiteboard, but also helps distribute force if the whiteboard is dropped on one of the corners.

The body 2305 is advantageously formed using moulding of liquid silicone rubber. This enables the body 2305 to be produced inexpensively and in high volume.

The skilled addressee will readily appreciate that alternatives to silicone may be used, including elastomers that are elastic and have a high failure strain, which includes rubber-like and silicone-like products.

According to certain embodiments, the silicone may be treated using antibacterial or antifungal chemicals. In particular, chemicals may be mixed into a liquid silicone rubber prior to moulding. However, the skilled addressee will readily appreciate that the body 2305, even without the addition of chemicals, has a certain resistance against bacteria and mould growth as the silicone does not retain any water, and the whiteboard 2300 is configured to dry quickly and not retain any water.

Advantageously, the whiteboard 2300 can be used to grip to shiny surfaces like glass, mirror and tiles, without requiring adhesives, suction caps or permanent mounts. In particular, the whiteboard 2300 may be applied to surfaces as many times as you like and it will not lose grip. As such, the whiteboard 2300 is particularly suited temporary use, as well as semi-permanent installation in kitchens and bathrooms, such as on windows, mirrors or tiles.

The whiteboard 2300 is easy to clean and hygienic. For example, as the whiteboard 2300 sits flush against the glass, tiles or mirror on which it is attached, dirt and grime cannot build up behind the whiteboard 2300. Furthermore, the whiteboard 2300 may be cleaned by rinsing it under warm or hot water, or by placing it in a dishwasher.

The whiteboard may be mounted at any height on a window, wall or mirror, e.g. in the kitchen, and as such, the user is able to comfortably read and write using the whiteboard.

An alternative embodiment of the present invention is described below in the form of an elastomeric holder including a bottle opener. This embodiment may be similar to the mirror and whiteboard embodiments, where the mirror or whiteboard element is replaced by a bottle opener element.

Figure 24A:
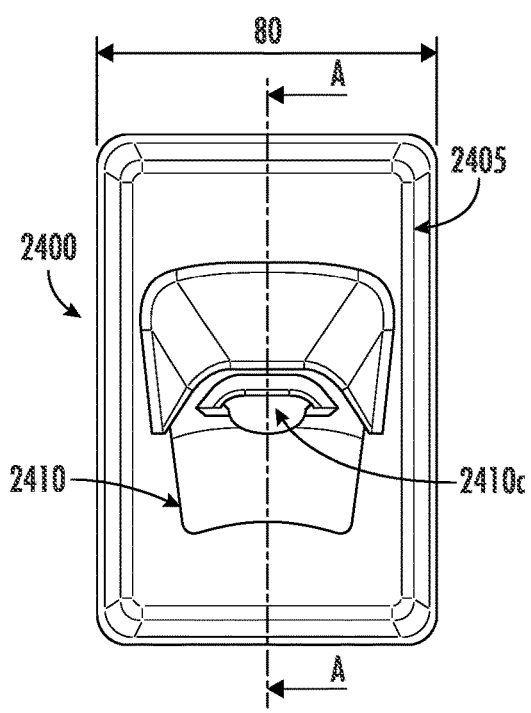
FIG. 24*a* illustrates a front view of a portable bottle opener, according to an embodiment of the present invention.
Figure 24B:
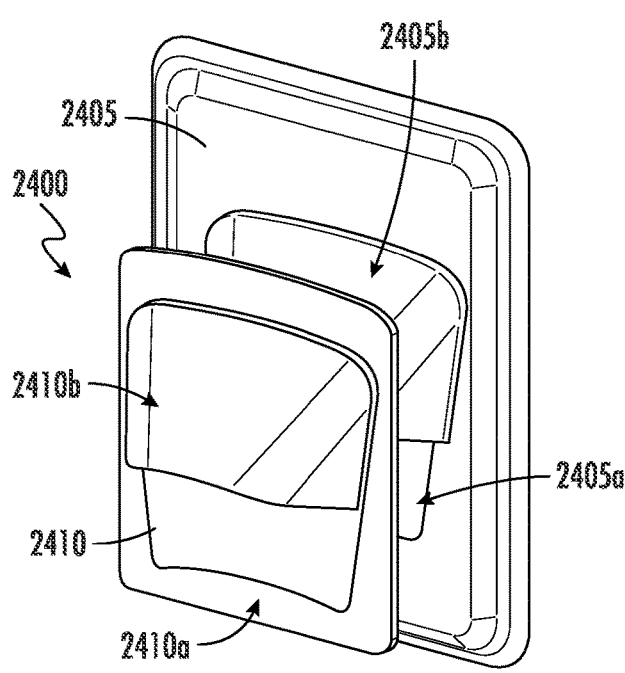
FIG. 24*b* illustrates an exploded perspective view of the bottle opener of FIG. 24*a*.
Figures 24C, 24D:
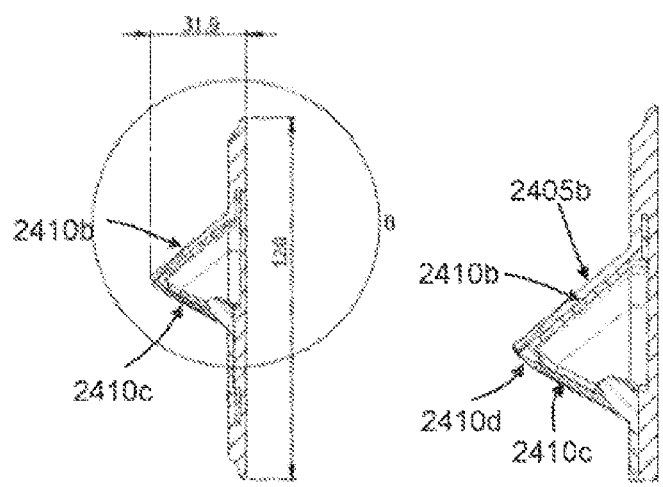
FIG. 24*c* illustrates a cross sectional view of the bottle opener of FIG. 24*a* through A-A of FIG. 24*a*.
FIG. 24*d* illustrates an enlarged cross-sectional view of portion 'B' of FIG. 24*c*.

FIG. 24a illustrates a front view of a portable bottle opener 2400, according to an embodiment of the present invention. FIG. 24b illustrates an exploded perspective view of the bottle opener 2400, FIG. 24c illustrates a cross sectional view of the bottle opener 2400 through A-A of FIG. 24a, and FIG. 24d illustrates an enlarged cross-sectional view of B' of FIG. 24c.

The portable bottle opener 2400 provides a non-permanent, handy and hygienic bottle opener for placement in the kitchen, office or other area (e.g. on a tile, glass, fridge, cabinet, locker or other flat surface).

The bottle opener 2400 includes a substantially planar, rectangular shaped body 2405, much like the body 1105, which is configured to releasably attach to a flat surface, such as a glass panel, tile, wall, fridge, cabinet or the like. A rear surface of the body 2405 is planar and glossy, and is configured to releasably adhere to such surfaces, in the same manner as the holders described above.

The bottle opener 2400 further includes a bottle opener element 2410 that is partially encased by the body 2405, such that corners and edges of the bottle opener element are covered by the body 2405.

In particular, the body 2405 includes a retainer in the form of an opening 2405a, for receiving the bottle opener element 2410, which enables the bottle opener element 2410 to be removed and reinserted into the body 2405. The body 2405 is stretched over the bottle opener element 2415 such that it fits snugly around the bottle opener element 2415. This simplifies manufacture, as the body 2415 may be made independently of the bottle opener element 2415.

The body includes lips that extend around a periphery of the bottle opener element, and approximately 1-10 mm over the edges of the bottle opener element 2415, as is described above in relation to the mirror 1100. Providing lips of such size has been found to be sufficient in retaining the bottler opener element 2410 in the body 2405, even when significant force is applied to the bottle opener, which is typical in use.

As best illustrated in FIGS. 24b and 24d, the bottle opener element 2410 includes a planar base 2410a, with a housing 2410b protruding outwardly from a central portion thereof. The housing defines an opening 2410c, for receiving a portion of a bottle top, the opening having an edge portion 2410d configured to remove a bottle top from a bottle when a base of the bottle is pivoted towards the wall (or similar surface) on which the bottle opener 2400 is presented.

The body 2405 includes a housing element 2405b, which extends outwardly over the opening 2405a which covers the housing 2410b. The housing element 2405b is not only aesthetically pleasing, but also functions to further assist in retaining the bottle opener element 2410 in the body 2405.

The body 2405 is formed of silicone rubber, and the bottle opener element is formed of steel, and preferably stainless steel.

Any of the holders described above may be formed using moulding of liquid silicone rubber. This enables the holders to be produced inexpensively and in high volume.

Advantageously, the holders can be used to grip to shiny surfaces like glass, mirror and tiles, without requiring adhesives, suction caps or permanent mounts. In particular, the holders may be applied to surfaces as many times as you like and it will not lose grip. As such, the holders are particularly suited to use in motels, hotels and other temporary accommodation, as well as semi-permanent installation in bathrooms, such as on mirrors or in showers.

The holders are easy to clean and hygienic. For example, as the holders sit flush against the glass, tiles or mirror on which they are attached, dirt and grime cannot build up behind the holders. Furthermore, the holders may be cleaned by rinsing it under warm or hot water, or by placing them in a dishwasher, without removing any adhesive properties of the holder.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An elastomeric holder comprising:
    a body, having a substantially planar rear surface, configured to releasably adhere to a vertical surface without adhesive; and
    a retainer, for retaining a planar item and formed at least in part by the body, such that a front surface of the body forms a peripheral edge around the retainer and around the planar item.

2. The elastomeric holder of claim 1, wherein the planar item comprises a mirror.

3. The elastomeric holder of claim 1, wherein the planar item comprises a whiteboard element.

4. The elastomeric holder of claim 1, wherein the planar item comprises a base of a bottle opener element.

5. The elastomeric holder of claim 1, wherein the holder further includes a second retainer, for retaining a second item, the second retainer extending outwardly from a front surface of the body.

6. The elastomeric holder of claim 5, wherein the planar item comprises a whiteboard, and the second item comprises a pen, for use on the whiteboard.

7. The elastomeric holder of claim 5, wherein the second retainer comprises parallel arms that extend outwardly from the body.

8. The elastomeric holder of claim 1, wherein the body is substantially rectangular.

9. The elastomeric holder of claim 1, wherein the body is substantially planar.

10. The elastomeric holder of claim 1, wherein the body is primarily of uniform thickness.

11. The elastomeric holder of claim 1, wherein the body comprises a lip that extends over an edge of the planar item.

12. The elastomeric holder of claim 11, wherein the lip extends approximately 1 mm over an edge of the planar item.

13. The elastomeric holder of claim 11, wherein the planar item is a mirror, and the lip extends over an edge of a reflective portion of the mirror.

14. The elastomeric holder of claim 2, wherein the planar mirror is formed of polycarbonate or other non-glass material.

15. The elastomeric holder of claim 3, wherein the whiteboard is formed of polycarbonate, acrylic, melamine, painted steel, enameled steel, or aluminium.

16. The elastomeric holder of claim 1, wherein the holder is integrally formed of silicone rubber.

17. The elastomeric holder of claim 1, wherein the holder is formed of silicone rubber.

18. The elastomeric holder of claim 1, wherein the rear surface is smoother than the front surface of the body.

19. A mirror configured to releasably adhere to a vertical surface without adhesive, the mirror comprising:
    a mirror element; and
    an elastomeric holder comprising:
        a body, having a substantially planar rear surface, configured to releasably adhere to the vertical surface without adhesive; and
        a retainer, for retaining the mirror element and formed at least in part by the body, such that a front surface of the body forms a peripheral edge around the retainer and around the mirror element.

20. A whiteboard configured to releasably adhere to a vertical surface without adhesive, the whiteboard comprising:
    a whiteboard element; and
    an elastomeric holder comprising:
        a body, having a substantially planar rear surface, configured to releasably adhere to the vertical surface without adhesive; and
        a retainer, for retaining the whiteboard element and formed at least in part by the body, such that a front surface of the body forms a peripheral edge around the retainer and around the whiteboard element.

* * * * *